(12) United States Patent
Luick

(10) Patent No.: US 6,910,104 B2
(45) Date of Patent: Jun. 21, 2005

(54) ICACHE-BASED VALUE PREDICTION MECHANISM

(75) Inventor: David A. Luick, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 301 days.

(21) Appl. No.: 10/251,050

(22) Filed: Sep. 20, 2002

(65) Prior Publication Data

US 2004/0059891 A1 Mar. 25, 2004

(51) Int. Cl.[7] ............................................. G06F 12/00
(52) U.S. Cl. ...................... 711/125; 711/169; 711/145; 711/171
(58) Field of Search ................................ 711/119, 122, 711/123, 125, 129, 137, 140, 144, 145, 126, 170, 171, 173; 712/207

(56) References Cited

U.S. PATENT DOCUMENTS 6,338,120 B1 * 1/2002 Hanley ....................... 711/136
6,408,380 B1 * 6/2002 Huck et al. .................. 712/225
6,434,669 B1 * 8/2002 Arimilli et al. .............. 711/128
2003/0065887 A1 * 4/2003 Maiyuran et al. ........... 711/137

* cited by examiner

Primary Examiner—Donald Sparks
Assistant Examiner—Brian R. Peugh
(74) Attorney, Agent, or Firm—Arnall Golden Gregory LLP

(57) ABSTRACT

An apparatus for executing an instruction in a computational pipeline includes a first instruction memory. The first instruction memory includes a first plurality of instruction fields, each of which is capable of holding an instruction therein. Each of a first plurality of value fields is uniquely associated with a corresponding instruction field from the first plurality of instruction fields. Each value field is capable of holding a data value therein that is likely to be required in executing an instruction held in the instruction field.

7 Claims, 2 Drawing Sheets

ICACHE-BASED VALUE PREDICTION MECHANISM

BACKGROUND OF THE INVENTION

1. Field of the Invention

The present invention relates to computational circuits and, more specifically, to a computational circuit that predicts values for a pipelined architecture.

2. Description of the Prior Art

Many modern computing systems use a processor having a pipelined architecture to increase instruction throughput. In theory, pipelined processors can execute one instruction per machine cycle when a well-ordered, sequential instruction stream is being executed. This is accomplished even though the instruction itself may require a number of separate microinstructions to be executed. Pipelined processors operate by breaking up the execution of an instruction into several stages that each require one machine cycle to complete. Latency is reduced in pipelined processors by initiating the processing of a second instruction before the execution of the first instruction is completed. In fact, multiple instructions can be in various stages of processing at any given time. Thus, the overall instruction execution latency of the system (which, in general, can be thought of as the delay between the time a sequence of instructions is initiated, and the time it is finished executing) can be significantly reduced.

Further improvement can be accomplished through the use of cache memory. Cache memory is a type of memory that is typically faster than main memory in a computer. A cache is typically coupled to one or more processors and to a main memory. A cache speeds access by maintaining a copy of the information stored at selected memory addresses so that access requests to the selected memory addresses by a processor are handled by the cache. Whenever an access request is received for a memory address not stored in the cache, the cache typically retrieves the information from the memory and forwards the information to the processor.

The benefits of a cache are maximized whenever the number of access requests to cached memory addresses, known as "cache hits", are maximized relative to the number of access requests to non-cached memory addresses, known as "cache misses". One way to increase the hit rate for a cache is to increase the size of the cache. However, adding size to a cache memory may increase costs associated with the computer and may extend the access time associated with the cache.

As the increase in frequency continues to outpace the raw transistor performance increases in silicon technology generations the depth of microprocessor pipelines becomes ever greater, where the time of access on L1 data cache becomes 3 or 4 cycles. This long cache fetch latency has a pronounced negative effect on commercial code and integer code where address and data dependencies are common. Further, the drive to high frequency also tends to reduce the obtainable size of an L1 data cache so that only a half or a quarter size cache is implementable at higher frequencies. The microprocessor industry needs a relatively simple solution to the dependency limited execution performance of integer code and the inability to scale data cache size with frequency, causing excessively high L1 cache miss rates.

It has been found by experiment recently that integer code, and in particular commercial and operating system code, perform a majority of their load and ALU instructions where the target of these instructions is a constant or nearly constant over many execution invocations. Thus, if a method can be found to remember this value from a previous execution of the code and quickly access it as a "guess" value for along latency load or other instruction target, then significant performance improvement can be gained. Provisions must still be made for determining if the "guess" value predicted is actually incorrect, and then allowing for corrective action to fix up the pipeline to flush these incorrect speculative results and to re-execute based on the slower but non-speculative load execution. However, when the "guess" target value is correct, a significant advantage is gained in that the next instruction after a load is often dependent on the load target value and must normally stall N cycles where N+1 is the load instruction latency.

Therefore, there is a need for a system that predicts values associated with instructions that are executed in a pipeline.

SUMMARY OF THE INVENTION

The disadvantages of the prior art are overcome by the present invention which, in one aspect, is an apparatus for executing an instruction in a computational pipeline that includes a first instruction memory. The first instruction memory includes a first plurality of instruction fields, each of which is capable of holding an instruction therein. Each of a first plurality of value fields is uniquely associated with a corresponding instruction field from the first plurality of instruction fields. Each value field is capable of holding a data value therein that is likely to be required in executing an instruction held in the instruction field.

In another aspect, the invention is a method of generating a computer executable instruction in which a predicted value is stored in association with an instruction in a first instruction memory. The predicted value is propagated with the instruction as the instruction is propagated from the first instruction memory to a second instruction memory.

In yet another aspect, the invention is a computer executable instruction that includes an instruction field and a value field. The instruction field includes data indicative of an operation to be executed by a computer. The value field includes data that is likely to be required in executing the operation indicated in the instruction field. The value field is associated with the instruction field and propagates with the instruction field through a plurality of levels of memory.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
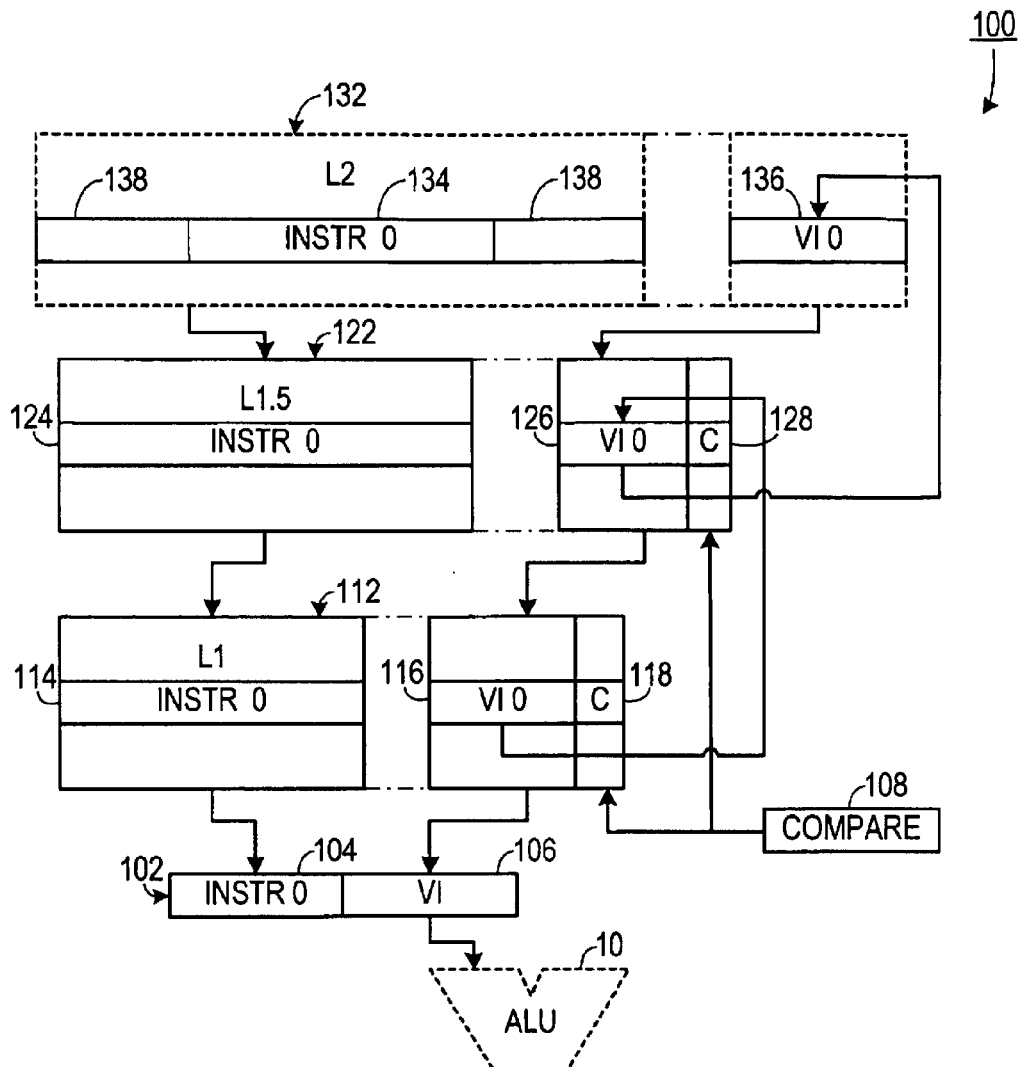
FIG. 1 is a block diagram on an illustrative embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a", "an", and "the" includes plural reference, the meaning of "in" includes "in" and "on".

As shown in FIG. 1, in one embodiment of the invention, a cache memory hierarchy 100 is implemented to supply an instruction register 102 of a pipelined computational circuit 10. The instruction register 102 includes an instruction field 104 that holds an executable instruction and a value field 106 that holds a data value that is to be operated on by the computational circuit 10 according to the instruction in the instruction field 104.

Supplying the instruction register 102 is a level one (L1) cache 112. The L1 cache 112 includes a plurality of instruction fields 114, each of which holds an instruction. At least one of the instruction fields 114 is associated with a value field 116, which is capable of holding a predicted value for data that will be used in the execution of the instruction. Initially, the value in stored the value field 116 is the value that is loaded from main memory the first time the instruction in the instruction field 114 is accessed. This value serves as a prediction for the value associated with the instruction during subsequent accesses of the instruction field 114. A compare circuit 108 determines if the value field 116 holds the correct value and, if the value is incorrect, the compare circuit 108 sets a change bit 118 that indicates that the value field 116 has been updated with the correct value.

Similarly, an intermediate cache (an L1.5 cache) 122 can supply the instruction to the L1 cache 112. Associated with the instruction 124 in the L1.5 cache 122 is a value field 126 and a change bit 128. A higher order memory, such as an L2 cache 132 also includes an instruction field 134 and a corresponding value field 136. The memory line storing the instruction field 134 may also store other instructions 138.

When the instruction in the value field 114 of the L1 cache 112 is overwritten, the system determines if the change bit 118 has been set and, if so, the updated value in the L1 value field 116 is written into the L1.5 value field 126. Similarly, when the L1.5 value field 126 is overwritten, the L2 value field 136 is overwritten with the contents of the L1.5 value field 126 if change bit 128 is set.

Figure 2:
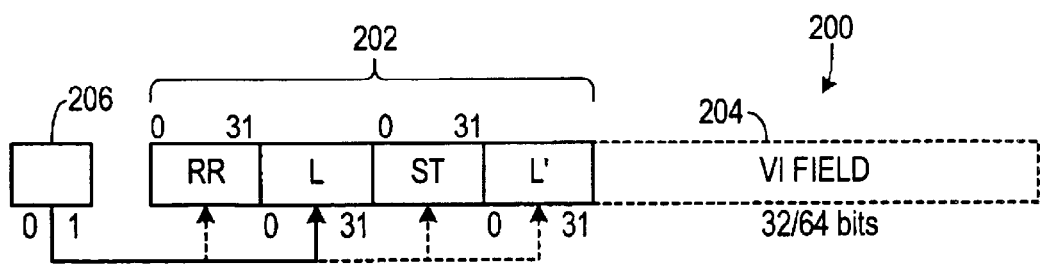
FIG. 2 is a diagram of an instruction line according to one embodiment of the invention.

One example of an instruction subline 200, which would be stored in a higher-order instruction memory such as an L2 cache, according to the invention is shown in FIG. 2. Such an instruction line 200 would include several instructions 202 and a value field 204. A value immediate ("VI") pointer 206 would indicate to which of the instructions 202 the value field 204 applied. The VI pointer could include a VI flag bit that, when set, indicates that a value field in a different instruction subline (such as the instruction line immediately preceding the current instruction line) holds a value field associated with an instruction in the current value field.

This invention differs from value cache schemes as the value cache elements are associated with the instruction cache ("I-cache") hierarchy, not the data cache and load pipeline. Rather than implementing the value table as a cache, retained predicted values are now treated as individual elements associated with a single or small group (2-4) of instructions (i.e., as an immediate value actually appended to the actual instruction(s) itself). Further, the value field (also referred to as "value immediate" or "VI" field) 204 can be kept in multiple levels of the I-cache hierarchy (L1.5, L2, etc.) by casting out changed values to the next higher level of instruction cache during an I-cache line reload such that there is no significant limit on the total size of the caching effect for predicted values. This means that every load instruction potentially can have its own predicted value field kept with it throughout the storage hierarchy as far as necessary for performance. As each load instruction requiring value prediction comes into the L1 I-cache, its value field automatically comes with it as if it were simply additional instruction bits (e.g., 32–64 bits).

Because only those loads that have a dependent use of their targets (roughly 30% of all loads) and that are highly predictable (which are about two thirds of such loads) need to use predict values (and, thus, the corresponding appended value fields), and since 25% of instructions are loads, then only about 5% of instructions actually require load value prediction with value fields. Even value prediction is generalized to include RR (ALU) instructions (another 25% of total), only approximately 10% of instructions require a value field. Further, since typically only one value prediction can be executed per cycle for many practical reasons, instructions can be conveniently grouped into four instruction sublines for the purpose of value prediction.

A simple rule may be imposed to reduce the cost for storing predicted values in the I-cache by a factor of four, which limits each subline to allow only one predicted value. For the load only predict case, the probability that two loads requiring prediction occur in the same subline is only about 15%. However, since two instructions on average exist in each parallel execution group and only one prediction per cycle is allowed, the true loss in value predict execution potential is less than 10%. Therefore, about 90% of all potential executable value prediction loads may still execute as required.

With the addition of a new flag bit, a previous group VI bit, a second value field in the same four instruction group can be placed in the previous four instruction group's value field if its value field is unoccupied (which is 90% likely). Thus, only about 1% of the value predict opportunity is ever lost on average.

Because the predicted values access with the instruction itself, they are available to the pipeline two to three cycles earlier than if they came from a distinct value cache. Because values are kept at multiple levels of the I-cache hierarchy, with about 90% of all loads having their own value field, the total value cache size approximately equals the size of the largest I-cache level where value predictions are kept. Typically, 1-2 MB of I-cache (L2) with a long line size provides a 99% hit rate or nearly 100% compared to perhaps an 80% hit rate for a 64 KB standalone value cache.

In a typical pipeline, the load instruction and the appended value field start down the load and LVI pipelines together. The Register File (RF) cycle is used to forward the VI value to the proper ALU/functional unit source input to allow the dependent use instruction following the load (which has a predict target value), the RR (dependent) instruction, to execute its ALU cycle in the very next cycle. This actually means then that the dependent RR instruction issues and executes exactly in parallel with the load instruction that it was dependent upon, which is the fastest possible execution pattern allowable for a fully in-order execution unit. The LVI pipeline is basically a dummy pipeline that forwards its value from stage to stage until the normal load target is available to perform a compare to determine if the speculative VI value was correct.

Figure 3:
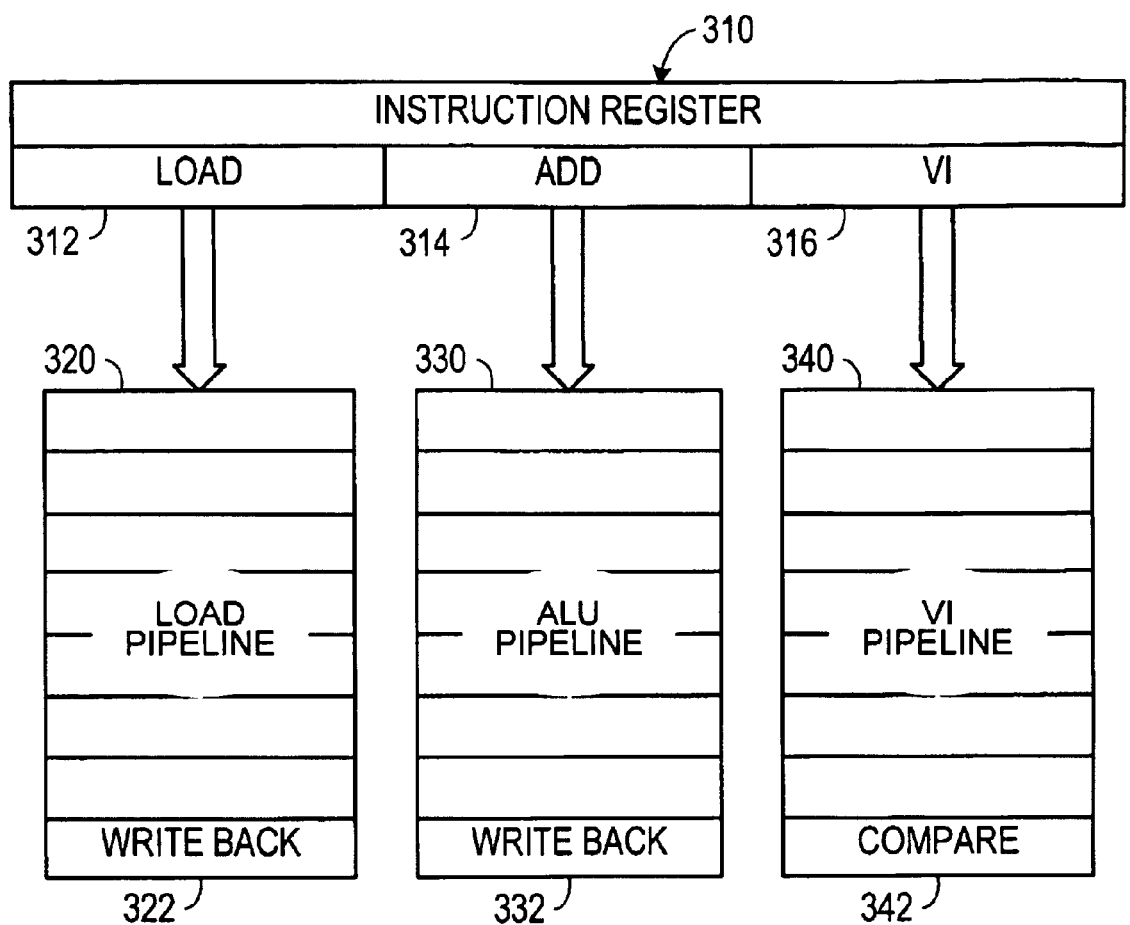
FIG. 3 is a diagram of a plurality of pipelines employing a value immediate field mechanism.

As shown in FIG. 3, a pipelined system according to the invention could include an instruction register 310 having a load field 312, an ALU field 314 and a value immediate (VI)

field 316. The value in the load field 312 would be fed to a load pipeline 320, the value in the ALU field 314 would be fed to an ALU pipeline 330 and the value in the value immediate field would be fed into a VI pipeline 340. The final stages of the load pipeline 320 and the ALU pipeline 330 are both write backs 322 and 332, whereas the final stage of the VI pipeline 340 is a compare 342. As can be seen, this arrangement allows a dependant instruction (e.g., ADD) to execute in parallel with the load instruction that it is dependant on.

While the embodiments disclosed above show use of value predictions associated with loads, the system is not restricted to using value predictions only with loads. It is understood that the inventive value prediction system may be employed with any type of instruction.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An apparatus for executing an instruction in a computational pipeline, comprising:
   a. a first instruction memory, including a first plurality of instruction fields, each instruction field capable of holding an instruction therein;
   b. a first plurality of value fields, each value field uniquely associated with a corresponding instruction field from the first plurality of instruction fields, each value field capable of holding a data value therein that is likely to be regiured in executing an instruction held in the instruction field; and
   c. a first flag bit associated with an instruction that, when set, indicates that a value field is associated with the instruction.

2. The apparatus of claim 1, wherein the first instruction memory comprises a cache memory.

3. The apparatus of claim 1, further comprising a change bit associated with each value field that is set when the data value of the value field has been changed.

4. The apparatus of claim 1, further comprising:
   a. a second instruction memory, hierarchically superior to the first instruction memory, including a second plurality of instruction fields, each instruction field capable of holding an instruction therein, the second plurality of instruction fields capable of holding at least each instruction held in the first plurality of instruction fields; and
   b. a second plurality of value fields, each value field uniquely associated with a corresponding instruction field from the second plurality of instruction fields, each value field capable of holding a data value therein that is likely to be required in executing an instruction held in the corresponding instruction field from the second plurality of instruction fields.

5. The apparatus of claim 4, wherein the first instruction memory comprises a cache memory.

6. An apparatus for executing an instruction in a computational pipeline, comprising:
   a. a first instruction memory, including a first plurality of instruction fields, each instruction field capable of holding an instruction therein; and
   b. a first plurality of value fields, each value field uniquely associated with a corresponding instruction field from the first plurality of instruction fields, each value field capable of holding a data value therein that is likely to be required in executing an instruction held in the instruction field, each instruction being arranged a part of an instruction line; and
   c. a previous group VI flag bit associated as with at least one predetermined instruction in a first instruction line that, when set, indicates that a value field in a second instruction line, different from the first instruction line, is associated as with the predetermined instruction.

7. A method of generating a computer executable instruction, comprising the steps of:
   a. storing a predicted value in association with an instruction in a first instruction memory;
   b. propagating the predicted value with the instruction as the instruction is propagated from the first instruction memory to a second instruction memory;
   c. storing a change bit in association with the predicted value in the second instruction memory; and
   d. writing over the predicted value in the first instruction memory with a most recent actual value if the change bit in the second instruction memory has been set when the instruction is written over in the second instruction memory.

* * * * *

UNITED STATES PATENT AND TRADEMARK OFFICE
CERTIFICATE OF CORRECTION

PATENT NO.    : 6,910,104 B2
DATED         : June 21, 2005
INVENTOR(S)   : David A. Luick It is certified that error appears in the above-identified patent and that said Letters Patent is hereby corrected as shown below:

Column 5,
Line 33, "reguired" should be -- required --.

Signed and Sealed this

Twenty-third Day of August, 2005

JON W. DUDAS
*Director of the United States Patent and Trademark Office*